Sept. 19, 1950     F. G. ZAGAR     2,522,735
MULTIPLE SPINDLE DRIVING MECHANISM
Filed Dec. 29, 1945     2 Sheets-Sheet 2

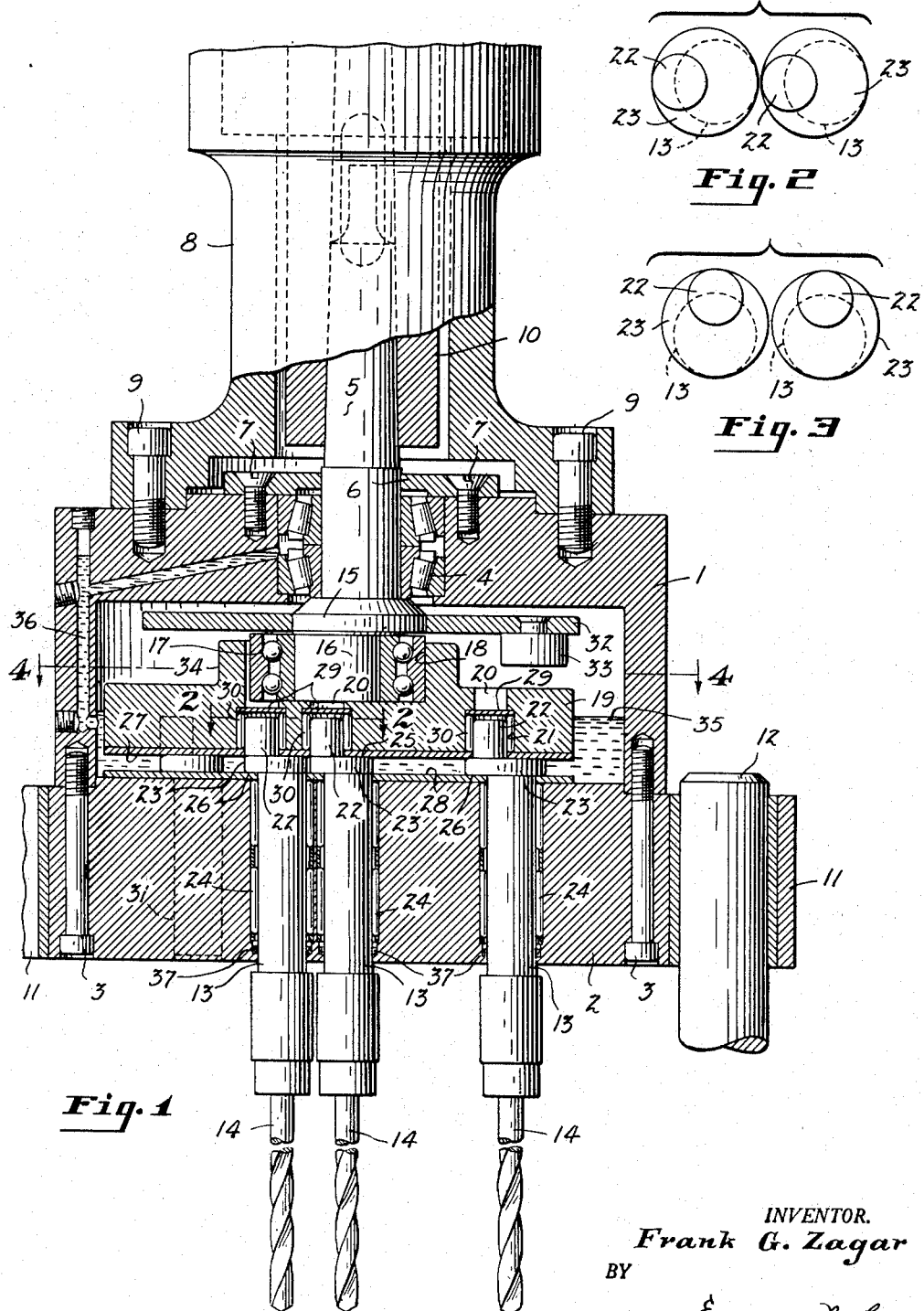

INVENTOR.
Frank G. Zagar
BY
Evans + McCoy
ATTORNEYS

Patented Sept. 19, 1950

2,522,735

UNITED STATES PATENT OFFICE 2,522,735

MULTIPLE SPINDLE DRIVING MECHANISM

Frank G. Zagar, Euclid, Ohio, assignor to Zagar Tool, Inc., Cleveland, Ohio, a corporation of Ohio Application December 29, 1945, Serial No. 638,140

6 Claims. (Cl. 74—63)

This invention relates to spindle driving mechanisms and more particularly to a multiple spindle driving mechanism for drill press heads.

The invention has for an object to provide a driving mechanism of the parallel motion driving plate type in which the driving spindle is so connected to the driving plate that one or more driven spindles may be mounted directly beneath the driving spindles.

A further object of the invention is to provide a construction which enables driven spindles of the type provided with integral crank portions which form thrust shoulders to be mounted closely adjacent one another.

A further object of the invention is to provide improved bearings for the driven cranks and spindles.

An additional object is to eliminate the vibration in driving mechanisms of the character referred to.

With the above and other objects in view, the invention may be said to comprise the mechanism as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a vertical central section through a multiple spindle drill press head embodying the invention;

Figs. 2 and 3 are diagrammatic plan views, showing the upper ends of two closely adjacent drill spindles with their cranks and crank pins in different angular positions which they occupy during their rotation;

Figure 4:
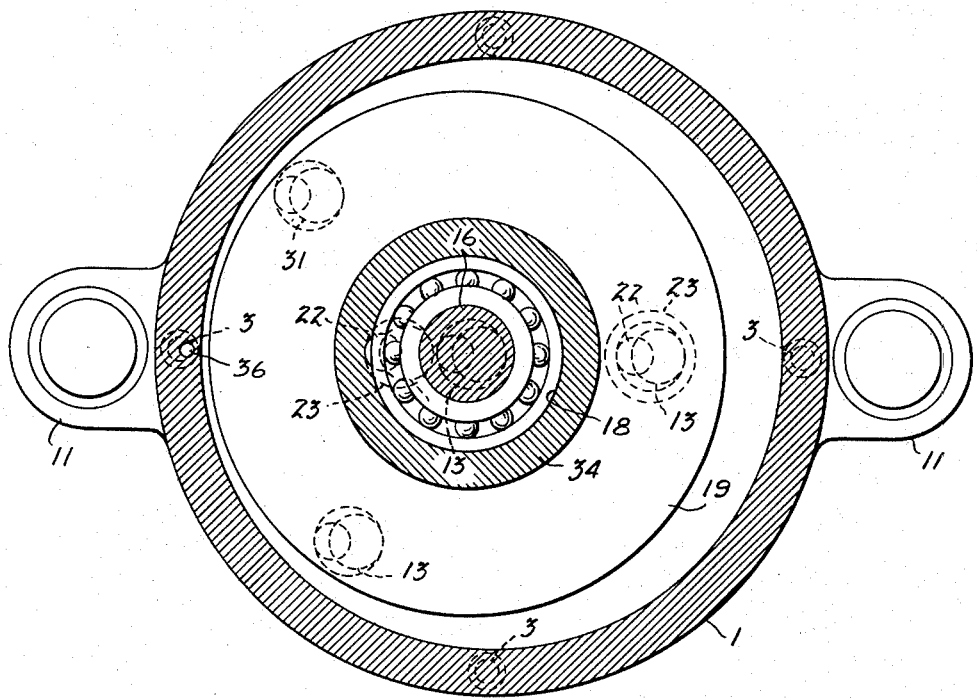
Fig. 4 is a horizontal section taken on the line indicated at 4—4 in Fig. 1.
Figure 5:
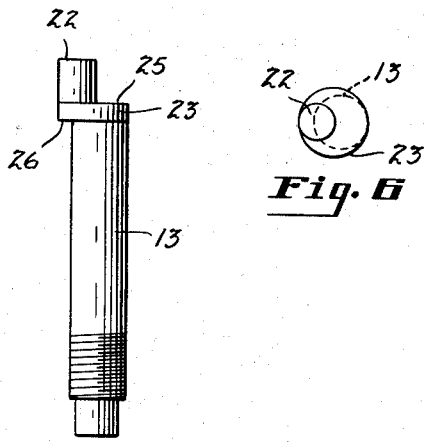
Fig. 5 is a side elevation of one of the drill spindles.
Figure 6:
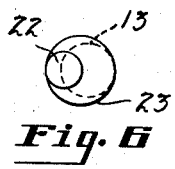
Fig. 6 is a top plan view of the spindle shown in Fig. 5.

Referring to the accompanying drawings, the driving mechanism of the present invention is mounted in a housing which is formed by a cup shaped top member 1 and a detachable bottom plate 2, the bottom plate 2 being secured to the rim of the cup shaped top member 1 by suitable means such as bolts 3. The top wall of the housing and the detachable bottom wall provide bearings for driving and driven spindles and are relatively thick, the top wall being centrally bored and counterbored to receive a roller thrust bearing 4 for a driving spindle 5, the bearing 4 being held in place by means of an annular plate 6 secured to the top of the housing by suitable means such as screws 7. The housing has a tubular extension 8 which encloses the projecting portion of the spindle 5, the extension 8 being secured to the top member 1 by suitable means such as bolts 9. The spindle 5 has connection with a tubular driving member 10 within the extension 8, the member 10 being a suitable drive shaft such as the driving spindle of a drill press.

The bottom wall 2 has extensions 11 which are bored to receive vertical guide posts 12 which hold the housing against turning movements while it is being moved up and down and aline the head with the work holding jig. The lower wall 2 is bored and counterbored to receive bearings for a number of driven spindles 13 to which suitable cutting tools such as drills 14 may be attached. The driving spindle 5 has a crank portion 15 within the housing to which a downwardly extending crank pin 16 is attached, the crank pin 16 being received in a ball bearing 17 mounted in an upwardly facing socket 18 formed in a drive plate 19. The drive plate 19 has a series of vertical bores 20 opening to the top thereof and counterbores 21 which form downwardly facing sockets to receive crank pins 22 carried by cranks 23 at the upper ends of the driven spindles 13.

Suitable anti-friction bearings such as needle bearings 24 for the driven spindles 13 are provided in the counterbores of the bottom wall 2. The crank portions 23 of the driven spindles are formed integrally with the spindles and have flat top and bottom shoulders 25 and 26 that engage with thrust bearing plates 27 and 28 that are interposed between the cranks 23 and the bottom face of the drive plate 19 and the top face of the bottom wall 2. The bearing plates 28 have openings in which the spindles 13 fit that register with the openings of the bottom wall 2 in which the cylindrical body portions of the driven spindles 13 are mounted.

In the upper end of each of the counterbores 21 there is mounted a disc 29 which fits within the counterbore. The discs 29 engage the upper ends of needle bearings 30 which are mounted in the counterbores 20, the thrust bearing plate 27 having openings which register with counterbores 21 and which are of a size to receive the crank pins 22. The discs 29 serve to facilitate the removal of the bearings 30 which have a press fit in the counterbores 20, each disc being adapted to be pushed out of the counterbores 21 by a suitable tool inserted through the bore 20.

The crank portions 23 of the driven spindles are preferably cylindrical in form and eccentrically disposed with respect to the body portions of the spindles. The crank portion 23 is of larger diameter than the body portion of the spindle and of larger diameter than the crank pin 22, which is offset with respect to the axis of the spindle. In order to permit spindles to be mounted closely adjacent one another, the crank portions 23 are preferably so disposed with respect to the body portion of the spindle and the crank pins 22 that the peripheries of the cylindrical body of the spindle and of the crank pin are substantially internally tangent at diametrically opposite points to the periphery of the crank 23. With the crank and crank pin so formed the spindles may be mounted closely adjacent one another, with the distance between the axes of any two spindles not substantially greater than the sum of the radii of the two spindle bodies and the overhang of the periphery of one of the cranks. By providing crank pin receiving sockets in the drive plate that are correspondingly spaced, the closely spaced cranks will rotate without interference, as illustrated in Figs. 2 and 3 and will have adequate thrust bearing surfaces.

Since it is desirable in order to insure smooth operation that there be at least three angularly spaced driven spindles, one or more idle spindles 31 are preferably provided in the bottom plate 2, positioned for engagement with the drive plate 19 adjacent its periphery.

It has been found desirable to counterbalance the main driving spindle 5 in order to prevent the transmission of objectionable vibrations to the supporting housing. This counter-balancing is effected by means of a disc 32 attached to the crank portion 15 of the spindle 5 above the drive plate 19. The disc 32 has an eccentrically disposed weight 33 attached thereto in a position to balance the spindle 5. The proper balance for the spindle 5 is preferably determined after the drive plate and driven spindles for the head have been assembled, the size and position of the weight being such as to effect a smooth running balance for the spindle for the particular arrangement of driven spindles employed.

In order to reduce the weight of the drive plate 19 and to provide a space for the weight 33, the central portion 34 of the drive plate may be raised above the peripheral portion in order to provide a crank pin receiving socket of the proper depth in the top of the drive plate and clearance for the weight 13 between the disc 32 and the peripheral portion of the plate. It will be noted that the upper ends of the crank pin receiving sockets in the bottom of the drive plate are entirely below the crank pin receiving socket in the top of the plate so that one or more of the driven spindles may be mounted directly beneath the main driving spindles, as is shown in Fig. 1. By means of this construction closely spaced driven spindles may be mounted at any point beneath the drive plate so that the entire plate is available for any desired arrangement of spindles.

An important and inherent advantage of resisting the spindle thrusts entirely by thrust bearings disposed above the bottom wall of the lubricant chamber, or within the lubricant chamber, is that the thrust bearings may be much more efficiently and effectively lubricated. Other important and inherent advantages of this construction are those of space economy and simplicity of construction. Individual thrust bearings for the several spindles interfere with the close spacing of the spindles desired in various drilling operations. To reduce the lateral dimensions of individual thrust bearings and still provide adequate bearing areas has required structural complications and limitations that are even more objectionable. However, by eliminating the individual thrust bearings for the various spindles, and substituting thrust bearings between the upper ends of the spindles and the driving plate 19, the present invention has made it possible to bring the spindles much closer together without any structural complications.

When a number of closely spaced spindles and crank pin bearings are provided in the bottom plate 2 and driving plate 19, considerable heat may be generated in the head during operation. It has been found that the heat thus generated is much more effectively dissipated if the driving plate chamber in the member 1 is partially filled with oil as indicated at 35 in Fig. 1, than when the chamber is completely filled with oil, probably because the flow of oil over the metal surfaces caused by the moving parts in the oil chamber effects a more rapid transfer of heat from the liquid to the metal. It has also been found that the moving parts within the oil chamber have a pumping action such that oil may be continuously circulated through one or more passages in the member 1. A passage 36 in the member 1 leads from the lower portion of the oil chamber to the spindle bearing 4 in the member 1. During operation of the mechanism liquid will be caused to rise in the passage 36 and flow into the bearing 4 as illustrated in Fig. 1. Oil also flows by gravity to the spindle bearings 24 in the bottom plate 2, suitable oil rings 37 being provided beneath the bearings 24 to prevent leakage of oil.

It is to be understood that variations and modifications of the specific devices herein shown and described for purposes of illustration, may be made without departing from the spirit of the invention.

What I claim is:

1. In a device of the character described, a housing defining a downwardly opening lubricant chamber having a top wall, a detachable bottom wall for said lubricant chamber spaced from said top wall, a driving spindle passing through and journaled in said top wall, said spindle having a crank and crank pin at its lower end within said lubricant chamber, a driving plate in said lubricant chamber, said plate having an upwardly facing socket receiving the crank pin of the driving spindle and a plurality of downwardly facing sockets, a plurality of driven spindles passing through said bottom wall and slidably journaled therein without restraint against upward axial thrusts thereon, each of said spindles having a crank and crank pin at its upper end within said lubricant chamber, the crank pins of the driven spindles being respectively journaled in said downwardly facing sockets, bearing means associated with said driving plate within said lubricant chamber for receiving and transmitting to said driving plate substantially all upward axial thrust applied to said driven spindles, and bearing means associated with said housing above said bottom wall for receiving and transmitting to the housing substantially all vertical axial thrust applied to said driving plate.

2. In a device of the character described, a housing defining a downwardly opening lubricant chamber having a top wall, a detachable bottom wall for said lubricant chamber spaced from said top wall, a driving spindle passing through and journaled in said top wall, said spindle having a crank and crank pin at its lower end within said lubricant chamber, a driving plate in said lubricant chamber, said plate having an upwardly facing socket receiving the crank pin of the driving spindle and a plurality of downwardly facing sockets disposed entirely below the upwardly facing socket, at least one of said downwardly facing sockets being directly below said upwardly facing socket, a plurality of driven spindles passing through said bottom wall and slidably journaled therein without restraint against upward axial thrusts thereon, each of said spindles having a crank and crank pin at its upper end within said lubricant chamber, the crank pins of the driven spindles being respectively journaled in said downwardly facing sockets, bearing means associated with said driving plate within said lubricant chamber for receiving and transmitting to the housing substantially all vertical axial thrust applied to said driving plate.

3. In a device of the character described, a housing defining a downwardly opening lubricant chamber having a top wall, a detachable bottom wall for said lubricant chamber spaced from said top wall, a driving spindle passing through and journaled in said top wall, said spindle having a crank and crank pin at its lower end within said lubricant chamber, a driving plate in said lubricant chamber, said plate having an upwardly facing socket receiving the crank pin of the driving spindle and a plurality of downwardly facing sockets, a plurality of driven spindles passing through said bottom wall and slidably journaled therein without restraint against upward axial thrusts thereon, each of said spindles having a crank and crank pin at its upper end within said lubricant chamber, the crank pins of the driven spindles being respectively journaled in said downwardly facing sockets, and the cranks of the driven spindles having upwardly facing thrust shoulders, bearing means associated with said driving plate within said lubricant chamber, including a bearing plate between said upwardly facing thrust shoulders and said driving plate, for receiving and transmitting to said driving plate substantially all upward axial thrust applied to said driven spindles, and bearing means associated with said housing above said bottom wall for receiving and transmitting to the housing substantially all vertical axial thrust applied to said driving plate.

4. In a device of the character described, a housing defining a downwardly opening lubricant chamber having a top wall, a detachable bottom wall for said lubricant chamber spaced from said top wall, a driving spindle passing through and journaled in said top wall, said spindle having a crank and crank pin at its lower end within said lubricant chamber, a driving plate in said lubricant chamber, said plate having an upwardly facing socket receiving the crank pin of the driving spindle and a plurality of downwardly facing sockets, a plurality of driven spindles passing through said bottom wall and slidably journaled therein without restraint against upward axial thrusts thereon, each of said spindles having a crank and crank pin at its upper end within said lubricant chamber, the crank pins of the driven spindles being respectively journaled in said downwardly facing sockets and the cranks of the driven spindles having upwardly and downwardly facing thrust shoulders, a bearing plate resting on the top face of said bottom wall within said lubricant chamber and having openings receiving said driven spindles, additional bearing means within said lubricant chamber, including a bearing plate between said driving plate and the cranks of the driven spindles having openings receiving the crank pins of the driven spindles, for receiving and transmitting to said driving plate substantially all upward axial thrust applied to said driven spindles, and bearing means associated with said housing above said bottom wall for receiving and transmitting to the housing substantially all vertical axial thrust applied to said driving plate.

5. In a device of the character described, a housing defining a downwardly opening lubricant chamber having a top wall, a detachable bottom wall for said lubricant chamber spaced from said top wall, a driving spindle passing through and journaled in said top wall, said spindle having a crank and crank pin at its lower end within said lubricant chamber, a driving plate in said lubricant chamber, said plate having an upwardly facing socket receiving the crank pin of the driving spindle, a plurality of laterally spaced vertical bores in said driving plate opening to the top thereof and a corresponding plurality of respectively aligned counterbores therein forming downwardly facing sockets, a plurality of driven spindles passing through said bottom wall and slidably journaled therein without restraint against upward axial thrusts thereon, each of said spindles having a crank and crank pin at its upper end within said lubricant chamber, the crank pins of the driven spindles being respectively journaled in said downwardly facing sockets, discs seated in the upper ends of said counterbores, a bearing plate interposed in said lubricant chamber between the cranks of the driven spindles and the driving plate for receiving and transmitting to the driving plate substantially all vertical axial thrust applied to said driven spindles, said bearing plate having openings of less diameter than said counterbores and respectively aligned therewith for receiving the crank pins of the driven spindles, radially acting bearings disposed in said counterbores around the crank pins of the driven spindles and held between said discs and said bearing plate, and bearing means associated with said housing above said bottom wall for receiving and transmitting to the housing substantially all vertical axial thrust applied to said driving plate.

6. In a device of the character described, a housing defining a downwardly opening lubricant chamber having a top wall, a detachable bottom wall for said lubricant chamber spaced from said top wall, a driving spindle passing through and journaled in said top wall, said spindle having a crank and crank pin at its lower end within said lubricant chamber, a driving plate in said lubricant chamber, said plate having an upwardly facing socket receiving the crank pin of the driving spindle and a plurality of downwardly facing sockets, a plurality of driven spindles of equal radii passing through said bottom wall and slidably journaled therein without restraint against upward axial thrusts thereon, said spindles having cranks and crank pins at their upper ends within said lubricant chamber, the peripheries of the cranks of the driven spindles overhanging their spindles by equal distances and the crank pins of the driven spindles being respectively journaled in said downwardly facing sockets, bearing means associated with said driving plate within said lubricant chamber for receiving and transmitting to said driving plate substantially all upward axial thrust applied to said driven spindles, and bearing means associated with said housing above said bottom wall for receiving and transmitting to the housing substantially all vertical axial thrust applied to said driven plate, each spindle and associated crank pin being so disposed that their peripheries are substantially internally tangent to the periphery of their associated crank at diametrically opposite points, whereby the centerlines of any two adjacent spindles may be spaced apart a distance not substantially greater than the sum of the two spindle radii and the overhang of the periphery of one of their cranks.

FRANK G. ZAGAR.

REFERENCES CITED

The following references are of record in the file of this patent:

UNITED STATES PATENTS

| Number | Name | Date |
| --- | --- | --- |
| 1,281,785 | Kellow | Oct. 15, 1918 |
| 1,326,863 | Heinkel | Dec. 30, 1919 |
| 1,696,468 | Buhr | Dec. 25, 1928 |
| 2,353,529 | Valentine | July 11, 1944 |
| 2,369,345 | Folke | Feb. 13, 1945 |